United States Patent
Imasaki et al.

(10) Patent No.: US 6,963,277 B2
(45) Date of Patent: Nov. 8, 2005

(54) METHOD OF AND SYSTEM FOR MONITORING BEHAVIOR OF GROUP OF PERSONS, AND COMPUTER PROGRAM PRODUCT

(75) Inventors: Naoki Imasaki, Kanagawa (JP); Hideyuki Aisu, Kanagawa (JP); Toshiaki Tanaka, Tokyo (JP); Takeichiro Nishikawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 206 days.

(21) Appl. No.: 10/395,343

(22) Filed: Mar. 25, 2003

(65) Prior Publication Data

US 2003/0210148 A1 Nov. 13, 2003

(30) Foreign Application Priority Data

Mar. 26, 2002 (JP) ....................................... 2002-086829

(51) Int. Cl.[7] ................................................ G08B 1/08
(52) U.S. Cl. ................................ 340/539.1; 340/539.11; 340/539.13; 340/573.1
(58) Field of Search .......................... 340/539.1, 539.11, 340/539.12, 539.13, 573.1, 573.4

(56) References Cited

U.S. PATENT DOCUMENTS 6,437,696 B1 * 8/2002 Lemelson et al. ........ 340/573.4

FOREIGN PATENT DOCUMENTS

JP 11-249778 9/1999

* cited by examiner

Primary Examiner—Daryl C Pope
(74) Attorney, Agent, or Firm—Oblon, Spivak, McClelland, Maier & Neustadt, P.C.

(57) ABSTRACT

A behavior of a group of persons is monitored. Each person is given a radio frequency identification tag. Tag identification information that is unique to the radio frequency identification tag, and reader identification information that is unique to a tag reader, which detects the radio frequency identification tag, are acquired. A position of each of the persons in the group is detected based on the tag identification information and the reader identification information. A position of majority of the persons in the group is regarded as the position of the group. If the position of a person is different from the position of the group, then that person is determined as having parted from the group.

20 Claims, 18 Drawing Sheets

FIG.5

POSITION INFORMATION TABLE

| TAG IDENTIFICATION INFORMATION | READER IDENTIFICATION INFORMATION |
|---|---|
| $TID_1$ | $RID_1$ |

FIG.6

TAG IDENTIFICATION INFORMATION TABLE

| TAG LABEL | TAG IDENTIFICATION INFORMATION |
|---|---|
| #010011 | $TID_1$ |
| #010012 | $TID_2$ |
| #010013 | $TID_3$ |
| #010014 | $TID_4$ |
| ⋮ | ⋮ |

FIG.7

READER TABLE

| READER IDENTIFICATION INFORMATION | PLACE CODE | NAME | ZONE |
|---|---|---|---|
| $RID_1$ | $ZID_1$ | E1-A-1 | EAST PLACE |
| $RID_2$ | $ZID_2$ | E1-A-2 | EAST PLACE |
| $RID_3$ | $ZID_3$ | E1-A-3 | EAST PLACE |
| $RID_4$ | $ZID_4$ | W1-B-1 | WEST PLACE |
| ... | ... | ... | ... |

FIG.8

PERSON TABLE

| PERSON IDENTIFICATION INFORMATION | NAME |
|---|---|
| $PID_1$ | AAA |
| $PID_2$ | BBB |
| $PID_3$ | CCC |
| ... | ... |

FIG.9

GROUP TABLE

| GROUP IDENTIFICATION INFORMATION | NAME | NUMBER OF PERSONS | MEMBER | | | |
|---|---|---|---|---|---|---|
| $GID_1$ | MMM | 16 | $PID_2$ | $PID_3$ | $PID_4$ | ... |
| $GID_2$ | QQQ | 11 | $PID_{33}$ | $PID_{33}$ | $PID_{34}$ | ... |
| $GID_3$ | WWW | 23 | $PID_{71}$ | $PID_{72}$ | $PID_{73}$ | ... |
| ... | ... | ... | ... | ... | ... | ... |

FIG.10

TAG-PERSON RELATION TABLE

| TAG IDENTIFICATION INFORMATION | PERSON IDENTIFICATION INFORMATION |
|---|---|
| $TID_1$ | $PID_1$ |
| $TID_2$ | $PID_2$ |
| $TID_3$ | $PID_3$ |
| $TID_4$ | $PID_4$ |
| ⋮ | ⋮ |

FIG.11

RELATION DEFINITION TABLE

| TARGET-A | TARGET-B | RELATION FLAG |
|---|---|---|
| $PID_1$ | $GID_1$ | FGL |
| $GID_2$ | $GID_6$ | FXC |
| ⋮ | ⋮ | ⋮ |

FIG.12

RELATION FLAG TABLE

| RELATION FLAG | DEFINITION |
|---|---|
| FGL | TARGET-A IS A SUPERVISOR OF TARGET-B |
| FSG | TARGET-A CONTAINS TARGET-B AS SUB-GROUP |
| FXC | TARGET-A AND TARGET-B ARE NOT ALLOWED TO BE IN THE SAME PLACE AT A GIVEN TIME |
| FFL | TARGET-A FOLLOWS AFTER TARGET-B |
| FPA | TARGET-A IS NOT ALLOWED TO GO INTO TARGET-B |
| FOB | TARGET-A MONITORS TARGET-B |
| . . . | . . . |

FIG.13

ACTION SCHEDULE TABLE $GID_4$ : 9 OCT 2002

$GID_3$ : 9 OCT 2002

$GID_1$ : 9 OCT 2002

| PLACE CODE | ENTRY TIME |
|---|---|
| $ZID_{10}$ | 10:00:00 |
| $ZID_{11}$ | 10:15:00 |
| $ZID_{16}$ | 10:20:00 |
| $ZID_{11}$ | 10:22:00 |
| $ZID_{16}$ | 10:23:00 |
| $ZID_{11}$ | 10:26:00 |
| ⋮ | ⋮ |

FIG.14

TAG HISTORY TABLE

TID$_2$ : 9 OCT 2002

TID$_8$ : 9 OCT 2002

TID$_5$ : 9 OCT 2002

| PLACE CODE | ENTRY TIME($t_0$) | EXIT TIME($t_1$) |
|---|---|---|
| ZID$_{10}$ | 10:11:09 | 10:11:59 |
| ZID$_{11}$ | 10:11:58 | 10:13:20 |
| ZID$_{16}$ | 10:13:18 | 10:58:48 |
| ZID$_{11}$ | 10:58:47 | 10:59:28 |
| ZID$_{12}$ | 10:59:25 | 10:59:58 |
| ZID$_{13}$ | 10:59:57 | 11:01:08 |
| ZID$_{14}$ | 11:01:09 | 11:01:18 |
| ZID$_{19}$ | 11:01:16 | |

FIG.18

CURRENT TIME  10:23:45

GROUP NAME:MMM

CURRENT POSITION:E1-A-2

---

INFORMATION ABOUT PARTED PERSON(S)

NAME:AAA    CURRENT POSITION:E1-A-3

NAME:CCC    CURRENT POSITION:E1-A-3

METHOD OF AND SYSTEM FOR MONITORING BEHAVIOR OF GROUP OF PERSONS, AND COMPUTER PROGRAM PRODUCT

CROSS-REFERENCE TO RELATED APPLICATIONS

This application is based upon and claims the benefit of priority from the prior Japanese Patent Application No. 2002-086829 filed on Mar. 26, 2002 the entire contents of which are incorporated herein by reference.

BACKGROUND OF THE INVENTION

1) Field of the Invention

The present invention relates to a method of and a system for monitoring behavior of a group of persons in, for example, an event hall or an airport, and a computer program product.

2) Description of the Related Art

Conventionally a position information service is known in which a person obtains information about own position using a mobile communication terminal.

An example of the position information service is a cellular communication system. This cellular communication system detects a position of a mobile phone, controls the telecommunication lines based on the position of a mobile phone, and transmits to the mobile phone various information associated with the position.

Moreover, a wireless guide system that detects a position of a portable terminal carried by a person, for example, in a pavilion, is known. This wireless guide system causes the portable terminal to display information concerning an event in a booth in the pavilion when the person approaches the booth. The portable terminal is, for example, a personal digital assistant or a portable computer.

Both the position information service and the wireless guide system are intended to provide a service to the individual person carrying the mobile communication terminal or the portable terminal. However, the position information service and the wireless guide system do not provide the service for monitoring behavior of a predetermined group of persons.

No prior art is known that discloses monitoring behavior of the group of persons.

SUMMARY OF THE INVENTION

The present invention is directing to provide a method of and a system for monitoring behavior of each person in a group.

The monitoring method according to embodiments of the present invention is a method of monitoring behavior of a group of a plurality of persons each carrying a radio frequency identification tag. This monitoring method comprises acquiring tag identification information that is unique to the radio frequency identification tag, and reader identification information that is unique to a tag reader capable of detecting the radio frequency identification tag; detecting a position information of each of the persons in the group based on the tag identification information and the reader identification information; and obtaining a behavior information for the group using the position information.

The monitoring method according to embodiments of the present invention is a method of monitoring behavior of a group of a plurality of persons each carrying a radio frequency identification tag. This monitoring method comprises acquiring tag identification information that is unique to the radio frequency identification tag, and reader identification information that is unique to a tag reader capable of detecting the radio frequency identification tag; identifying the group and a position of the group identified, based on the tag identification information and the reader identification information; identifying person information corresponding to the identified group based on each of the tag identification information belonging to the group; and determining whether a predetermined relationship is satisfied between at least two selected from the group, the position of the group, and the person information.

The monitoring method according to embodiments of the present invention is a method of monitoring behavior of a group of a plurality of persons each carrying a radio frequency identification tag. This monitoring method comprises acquiring tag identification information that is unique to the radio frequency identification tag, and reader identification information that is unique to a tag reader capable of detecting the radio frequency identification tag; identifying a position of each of the groups based on the tag identification information and the reader identification information; and determining any one of whether the groups identified are approaching towards each other and whether the groups identified have encountered with each other based on the position of each of the groups.

The computer program product according to embodiments of the present invention realizes the monitoring method according to the present invention on a computer.

The monitoring system according to embodiments of the present invention is a system for monitoring behavior of a group of a plurality of persons. This monitoring system comprises a radio frequency identification tag carried by each of the persons, the radio frequency identification tag transmitting a wireless tag signal that includes tag identification information that is unique to the radio frequency identification tag; a tag reader that receives the wireless tag signal and transmits a reader signal that includes the tag identification information included in the wireless tag signal and reader identification information that is unique to the tag reader; and a determining unit that receives the reader signal, detects a position information of each of the persons in the group based on the tag identification information and the reader identification information included in the reader signal, and obtains a behavior information for the group using the position information.

The monitoring system according to embodiments of the present invention is a system for monitoring behavior of a group of a plurality of persons. This monitoring system comprises a radio frequency identification tag carried by each of the persons, the radio frequency identification tag transmitting a wireless tag signal that includes tag identification information that is unique to the radio frequency identification tag; a tag reader that receives the wireless tag signal and transmits a reader signal that includes the tag identification information included in the wireless tag signal and reader identification information that is unique to the tag reader; and a determining unit that receives the reader signal, identifies the group, a position of the group, and person information that corresponds to the identified group, based on the tag identification information and the reader identification information included in the reader signal, and determines whether a predetermined relationship is satisfied between at least two selected from the group, the position of the group, and the person information.

The monitoring system according to embodiments of the present invention is a system for monitoring behavior of a group of a plurality of persons. This monitoring system comprises a radio frequency identification tag) carried by each of the persons, the radio frequency identification tag transmitting a wireless tag signal that includes tag identification information that is unique to the radio frequency identification tag; a tag reader that receives the wireless tag signal and transmits a reader signal that includes the tag identification information included in the wireless tag signal and reader identification information that is unique to the tag reader; and a determining unit that receives the reader signal, identifies a position of each of the groups based on the tag identification information and the reader identification information included in the reader signal, and determines any one of whether the identified groups are approaching towards each other and whether the identified groups have encountered with each other based on the position of each of the groups.

BRIEF DESCRIPTION OF THE DRAWINGS

FIG. 5 shows the contents of a position information table;

FIG. 6 shows the contents of a tag identification information table;

FIG. 7 shows the contents of a reader table;

FIG. 8 shows the contents of a person table;

FIG. 9 shows the contents of a group table;

FIG. 10 shows the contents of a tag-person relation table;

FIG. 11 shows the contents of a relation definition table;

FIG. 12 shows the contents of a relation flag table;

FIG. 13 shows the contents of an action schedule table;

FIG. 14 shows the contents of a tag history table;

FIG. 18 shows one example of a message indicating that at least one person has parted from the group;

DETAILED DESCRIPTION

Exemplary embodiments of the method, the system, and the computer program product relating to the present invention will be explained in detail below with reference to the accompanying drawings.

The monitoring system relating to the present invention detects a behavior of a group based on a position of each of the persons in the group, and outputs a warning when at least one person has parted from the group.

Figure 1:
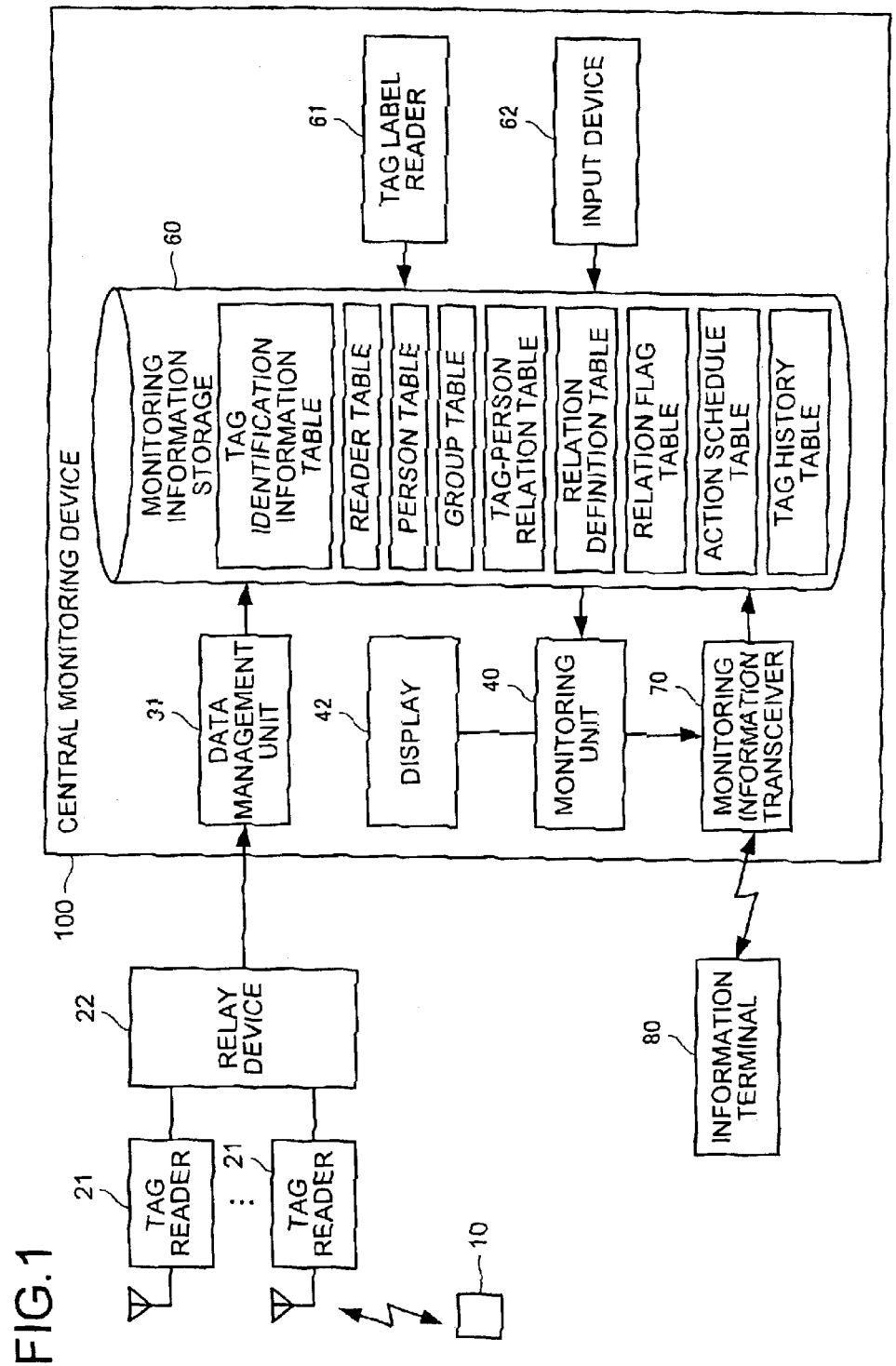
FIG. 1 schematically shows a configuration of the monitoring system according to one embodiment of the present invention.

FIG. 1 schematically shows a configuration of the monitoring system according to one embodiment of the present invention. The monitoring system shown in FIG. 1 is comprised of at least one RFID tag 10, a plurality of tag readers 21, a relay device 22, a central monitoring device 100, and information terminal 80.

Figure 2:
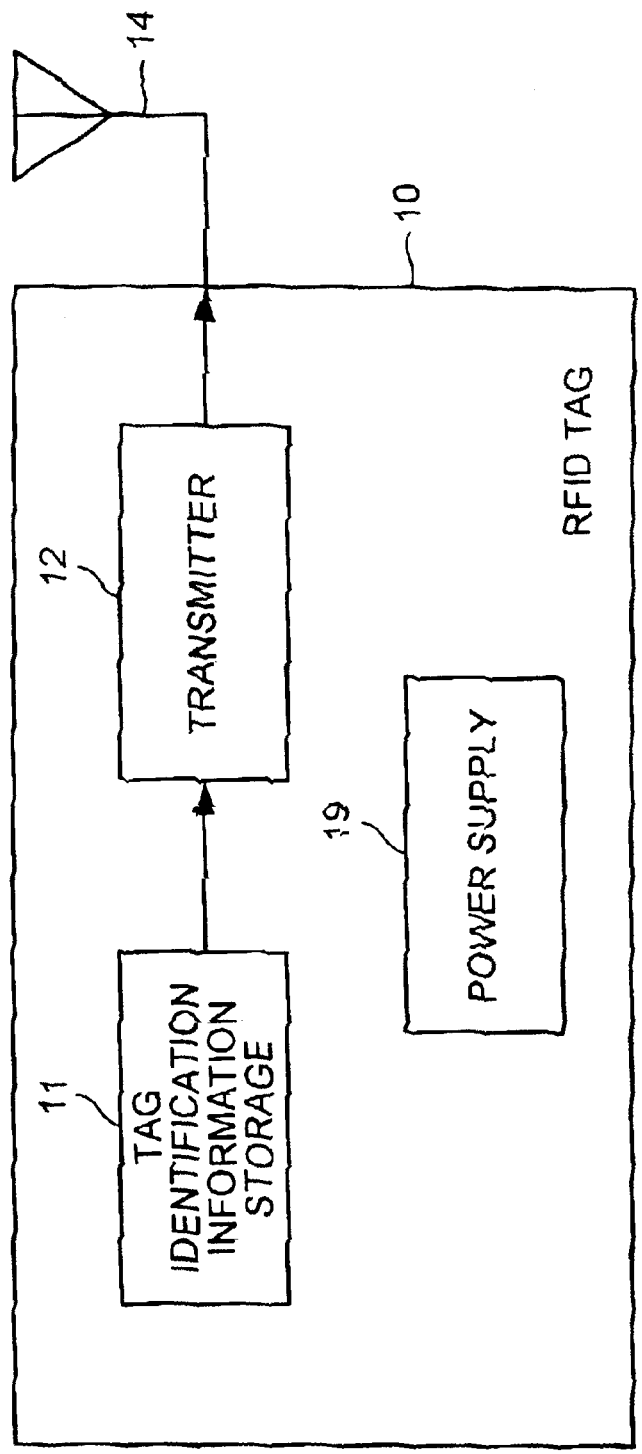
FIG. 2 schematically shows a configuration of a radio frequency identification tag (hereinafter, "RFID tag")

One RFID tag 10 is carried by a person who enters a predetermined surveillance area. FIG. 2 schematically shows a configuration of the RFID tag 10. The RFID tag 10 is comprised of a tag identification information storage 11, a transmitter 12, an antenna 14, and a power supply 19. The tag identification information storage 11 stores tag identification information that is unique to the RFID tag 10. The transmitter 12 generates and transmits a signal that includes the tag identification information.

The RFID tag 10 transmits a signal to the tag reader 21. Precisely, the signal generated by the transmitter 12 is transmitted to the tag reader 21 via the antenna 14. The transmission of the signal is performed at a certain timing which will be described in detail later. A tag label, which is unique, is affixed on a surface of each of the RFID tag 10. The tag label includes optical-readable characters, a barcode or the like.

One tag reader 21 is arranged in each of a plurality of the predetermined surveillance areas. The tag reader 21 receives a signal from the RFID tag 10 carried by a person entering into the surveillance area corresponding to the tag reader 21, extracts the tag identification information from the signal, and transmits the tag identification information to the relay device 22. Each tag reader 21 is assigned with reader identification information, which is unique.

Figure 3:
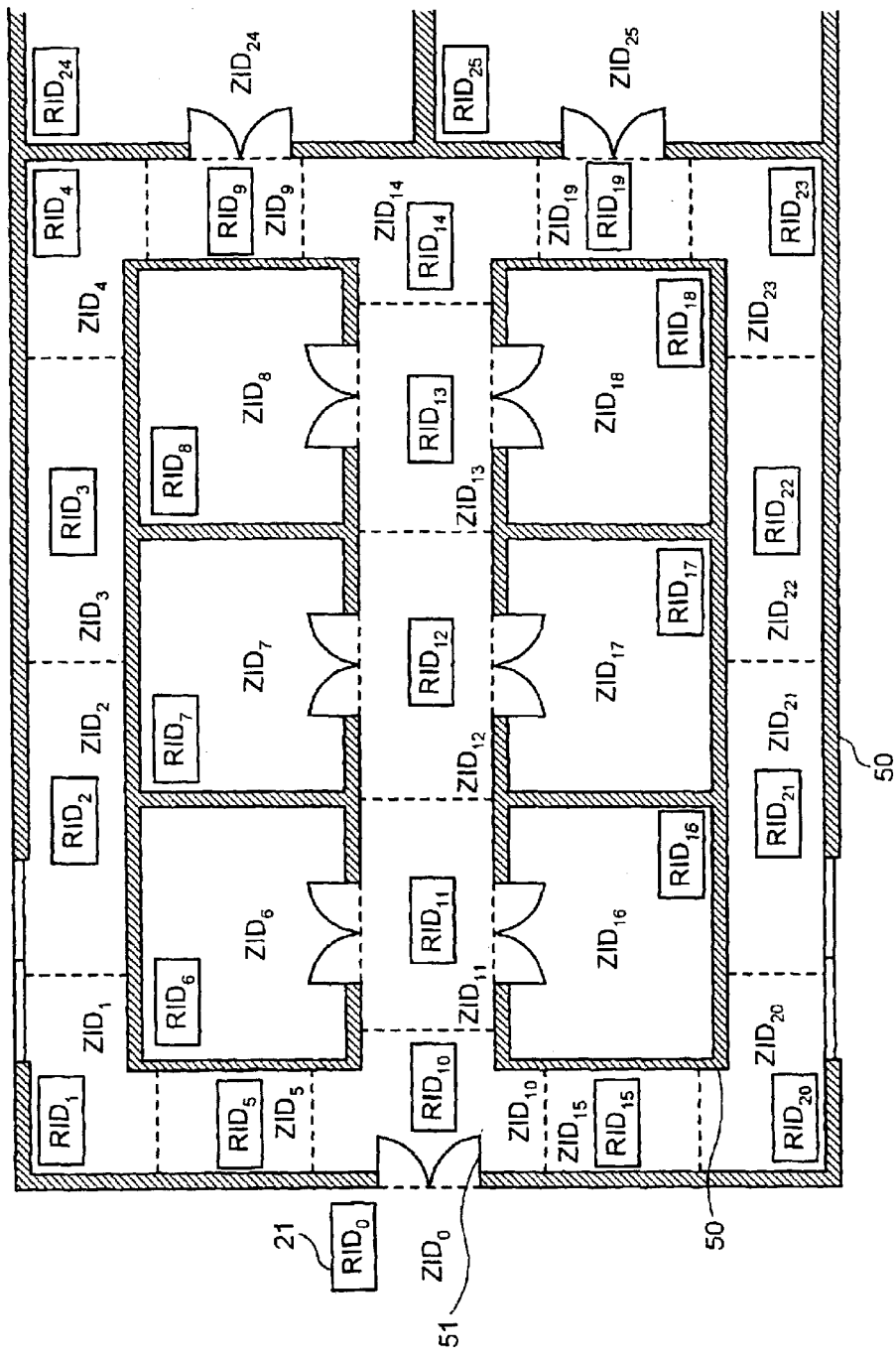
FIG. 3 shows one example of arrangement of tag readers.

FIG. 3 shows one example of arrangement of the tag readers 21. The surveillance areas are assigned with place code $ZID_1$, $ZID_2$, $ZID_3$, . . . , respectively. One tag reader 21 is arranged in each surveillance area. The tag readers 21 are assigned with reader identification information $RID_1$, $RID_2$, $RID_3$, . . . , respectively.

Sensitivity of receiving (hereinafter, "receiving sensitivity"), of each tag reader 21, a signal from the RFID tag 10 is adjusted so that the tag reader 21 detects only the RFID tag 10 in the surveillance area corresponding to that tag reader 21. However, the area in which a tag reader can detect a RFID tag (hereinafter, "detection range") is circular with the tag reader at its center.

Figure 4:
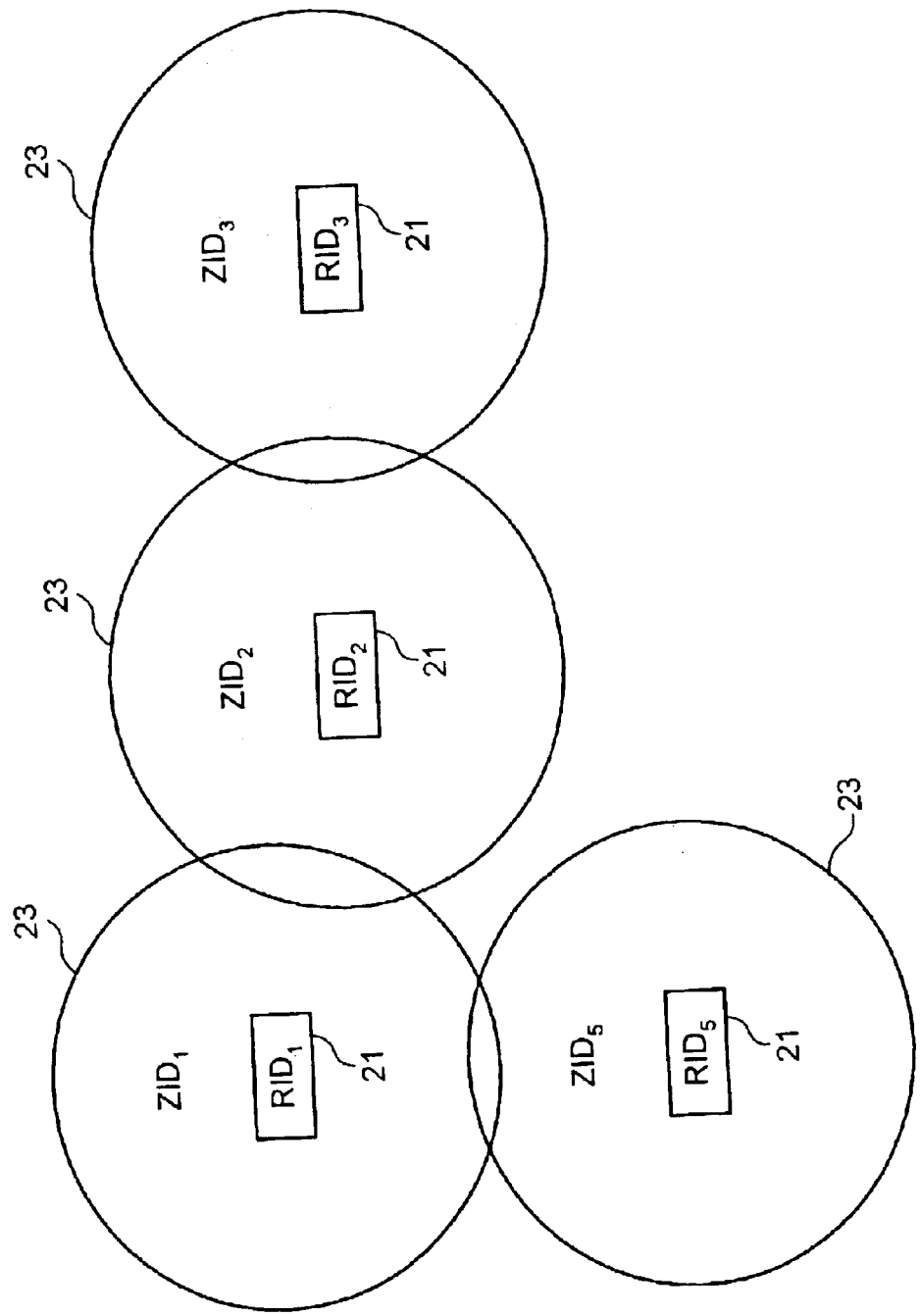
FIG. 4 explains a relation between the arrangement of the tag readers and capable range of detecting the RFID tag.

FIG. 4 explains a relation between the arrangement and the detection range of the tag readers 21. As shown in FIG. 4, it is desirable to adjust the receiving sensitivity and the position of each of the tag readers 21 in such a manner that detection ranges 23 of adjoining tag readers 21 overlap with each other so that there is no area that is not covered by any of the tag readers 21. Because of such overlap, it may happen that one RFID tag 10 is simultaneously read by a plurality of tag readers 21. However, in that case, the relay device 22 may give a priority to detection by a specific tag reader 21, based on certain conditions. For example, first, the velocity of the RFID tag 10 is calculated from a tag history table stored in the monitoring information storage 60, then the shift position of the RFID tag 10 is predicted based on the velocity, and the priority is given to the tag reader 21 that is near the shift position predicted.

Moreover, a timing at which a signal is transmitted from the RFID tag 10 may be set according to the distance between the adjoining tag readers 21. For example, if the distance between the tag readers 21 is relatively small, it is preferable to set the timing at a shorter interval time so as to increase the accuracy of detecting the RFID tag 10. On the other hand, the timing may be set considering factors other than the distance between the tag readers 21. For example, assuming that the persons carrying the RFID tag 10 are going to walk in a building, the timing may be set as once in a few seconds. By setting an appropriate timing it becomes possible to decrease the power consumption of the RFID tag 10 compared to the case in which the RFID tag 10 transmits the signals more number of times than necessary.

As shown in FIG. 3, the walls 50 are built so as to enclose some surveillance areas. The walls 50 separate individual surveillance areas. These walls 50 prevent, to some extent, detection of one RFID tag 10 simultaneously by a plurality of the tag readers 21. That is, the walls 50 serve to decrease the work load of the tag reader 21. For this purpose, it is preferable that the walls 50 are comprised of a material or have a thickness that makes it possible to interrupt passage of the radio frequency signals transmitted from the RFID tag 10. It is needless to say that, as shown in FIG. 3, all of the surveillances areas needs not be enclosed with the walls 50.

In the same way as the walls 50, it is preferable that doors 51 are comprised of a material or have a thickness that makes it possible to interrupt passage of the radio frequency signals transmitted from the RFID tag 10. On the other hand, if the tag reader 21 is fixed on the wall above the door 51, the door 51 can substantially interrupt the radio frequency signals even if it is not made of a specific material or does not have a specific thickness.

Returning to FIG. 1, the relay device 22 receives a signal, which includes the tag identification information, from the tag readers 21 arranged in a predetermined region. The relay device 22 appends reader information, which corresponding to the tag reader 21 that has received the signal from the RFID tag 10, to the tag identification information, and transmits the resultant signal to the central monitoring device 100. If the tag readers 21 and the relay device 22 are connected to each other via separate cables, then the relay device 22 can identify from which tag reader 21 the resultant signal has been received based on from which cable the resultant signal has been received.

On the other hand, if the tag readers 21 and the relay device 22 are connected to each other via a single common cable or if the tag readers 21 and the relay device 22 communicate with each other via a radio signal, then each tag reader 21 appends own reader identification information to the tag identification information and transmits the resultant signal to the relay device 22. In this case, the relay device 22 can identify the tag reader 21 based on the reader identification information included in the received signal.

The relay device 22 also receives various instruction signals from the central monitoring device 100, and transmits the instruction signals to the tag reader 21 or to the RFID tags 10.

The central monitoring device 100 is comprised of a data management unit 31, a monitoring unit 40, a display 42, a monitoring information storage 60, a tag label reader 61, an input device 62, and a monitoring information transceiver 70.

The data management unit 31 receives a signal from the relay device 22 and extracts the tag identification information and the reader identification information from the received signal. The data management unit 31 sends the information extracted and the time of receipt of the signal to the monitoring information storage 60. The monitoring information storage 60 stores the information and the time.

The input device 62 is for inputting various data by an operator. The data includes, for example, data that is to be registered in the monitoring information storage 60 and instructions to the central monitoring devices 100. The input device 62 is, for example, a keyboard or a pointing device.

The tag label reader 61 reads the tag label affixed to the RFID tag 10.

The monitoring unit 40 executes a tag history registration process, a parted person monitoring process, a behavior monitoring process, and a schedule monitoring process. These processes are executed according to an instruction generated by the monitoring unit 40 at a predetermined time interval or according to an instruction input by the operator, by referring to data stored in the monitoring information storage 60. These processes will be described in detail later.

The display 42 displays a message according to an instruction from the monitoring unit 40. The message is displayed, for example, when the result of detection shows that a person has parted from the group, or when a person or a group has shown a predetermined behavior, or when a group is not following a predetermined action schedule. The display 42 is, for example, a cathode ray tube (CRT) display or a liquid crystal display (LCD).

The monitoring information storage 60 stores a tag identification information table, a reader table, a person table, a group table, a tag-person relation table, a relation definition table, a relation flag table, and an action schedule table. These tables contain data input by the operator via the input device 62.

The tag identification information table contains, as shown in FIG. 6, an association of the tag labels and the tag identification information. This tag identification information table is referred to determine tag identification information associated with the tag label that is read by the tag label reader 61.

The reader table includes, as shown in FIG. 7, an association of the reader identification information and place information. The place information includes place code, name, and zone of the place where the tag reader 21 specified by the reader identification information is arranged.

The person table includes, as shown in FIG. 8, an association of person identification information and personal information. The person carrying the RFID tag 10 is identified from the person identification information. The personal information includes, for example, name of the person that is specified by the person identification information.

The group table includes, as shown in FIG. 9, an association of group identification information and group information. The group is identified based on the group identification information. The group information includes a name of the group, the number of persons in the group, and information for identifying each of the members in the group.

The tag-person relation table includes, as shown in FIG. 10, an association of the tag identification information and the person identification information, which is in the person table. Especially, this tag-person relation table is useful to acquire the person identification information. Next, based on the person identification information, personal information of the person carrying the RFID tag 10 can be acquired by referring to the person table (see FIG. 8).

The relation definition table includes, as shown FIG. 11, an association of target information and a relation flag. The target information includes, for example, a target-A and a target-B. The target-A or the target-B may be any one of the group identification information, the person identification information, and the place code. In other words, this relation definition table indicates predetermined behavior or a predetermined attribute of the group and a person(s) in the group, as a mutual relation of the group, the person, and a place.

The relation flag table includes, as shown FIG. 12, a definition of each of the relation flags.

The action schedule table includes, as shown in FIG. 13, an association of the place code and time information for each of the group identification information. The time information includes an entry time of each group in the surveillance area specified by the place code. That is, this action schedule table indicates the schedule of each group.

The tag identification information table, the reader table, the person table, the group table, the tag-person relation table, the relation definition table, the relation flag table, and the action schedule table are mutually in the normalized relation, and construct the relational database. For example, the relation definition table and the action schedule table are associated with the place code, because, there is less probability that the place code is changed. Assume, for example, that one of the tag readers 21 has broken down and it has to be replaced with a new one. In this case, the reader identification information of the broken tag reader 21 in the reader table may be simply changed with that of the new one. In this way, it becomes possible to reduce the work load, for changing the information, on the manager of the system.

The tag history table is managed by the data management unit 31. The tag history table contains, as shown in FIG. 14, an association of the place code and time information for each of the tag identification information. The time information includes entry time ($t_0$) and exit time ($t_1$) of each person in the surveillance area that is specified by the place code.

The central monitoring device 100 is an information processor such as a personal computer or a workstation. The central monitoring device 100 is comprised of a microprocessor unit (MPU), a secondary storage such as a memory and a hard disk drive (HDD), output devices such as a display unit and/or a printer, and input devices such as a keyboard and/or a mouse. The central monitoring device 100 may further serve the same function as the tag reader 21 and read the tag identification information of the RFID tag 10 thereby.

Although the monitoring system shown in FIG. 1 has the relay device 22, it is not necessarily required if each tag reader 21 has the function similar to the relay device 22.

The information terminal 80 is a communication device such as a personal digital assistant with a transceiver, or a mobile phone. The information terminal 80 is carried by, for example, the guard. The information terminal 80 receives various message from the monitoring information transceiver 70 and displays it. Moreover, the information terminal 80 may be employed for inputting various data by an operator. The data is, for example, data for registering in the monitoring information storage 60 and instructions to the central monitoring devices 100.

The tag history registration process, the parted person monitoring process, the behavior monitoring process, and the schedule monitoring process will be explained in detail below.

First, the tag history registration process will be explained below. The RFID tag 10, which is carried by a person, periodically transmits own tag identification information. When the person enters into the surveillance area, the tag reader 21 in that surveillance area receives the tag identification information of the RFID tag 10 carried by that person. In other words, the tag reader 21 can detect and identify the RFID tags 10 existing in the surveillance area. The tag reader 21 appends own reader identification information to the tag identification information and transmits the resultant signal to the relay device 22. The relay device 22 receives the signal, that is, the tag identification information and the reader identification information, and transmits the set of information to the data management unit 31 of the central monitoring device 100.

The data management unit 31 executes the tag history registration process based on the received tag identification information and the reader identification information. In the tag history registration process, concretely, first, the data management unit 31, by referring to the monitoring information storage 60, confirms whether the tag history table of the tag identification information received has been created. If it is determined that the tag history table has not been created, the monitoring information storage 60 creates a tag history table of the corresponding tag identification information. Then, the data management unit 31 refers to the reader table (see FIG. 7) and determines the place code corresponding to the reader identification information received. Further, the data management unit 31 registers this place code in the place code field of the tag history table (see FIG. 14) (hereinafter, "first registration process").

Next, if an entry time corresponding to this place code has not been registered, the data management unit 31 registers the time (hereinafter, "reception time") at which the tag identification information and the reader identification information were received as the entry time (hereinafter, "second registration process"). On the other hand, if an entry time has been recorded corresponding to this place code, then the data management unit 31 registers the reception time as an exit time (hereinafter, "third registration process"). The data management unit 31 repeats the third registration process until the place code has changed. When the place code has changed, the data management unit 31 executes the first registration process with respect to the changed place code.

In this manner, the tag history table is updated at the timing that the data management unit 31 receives the tag identification information and the reader identification information from the relay device 22. It is assumed here that each tag reader 21 is given the priority of detecting the RFID tag 10.

Thus, the place code is a record of movements of each of the RFID tags 10. Since the place code is the primary key in the tag history table for each tag identification information, even if the reader identification information has been changed due to the failure of the tag reader 21, it is possible continuously to refer to past movement history of the RFID tag 10.

Figure 15:
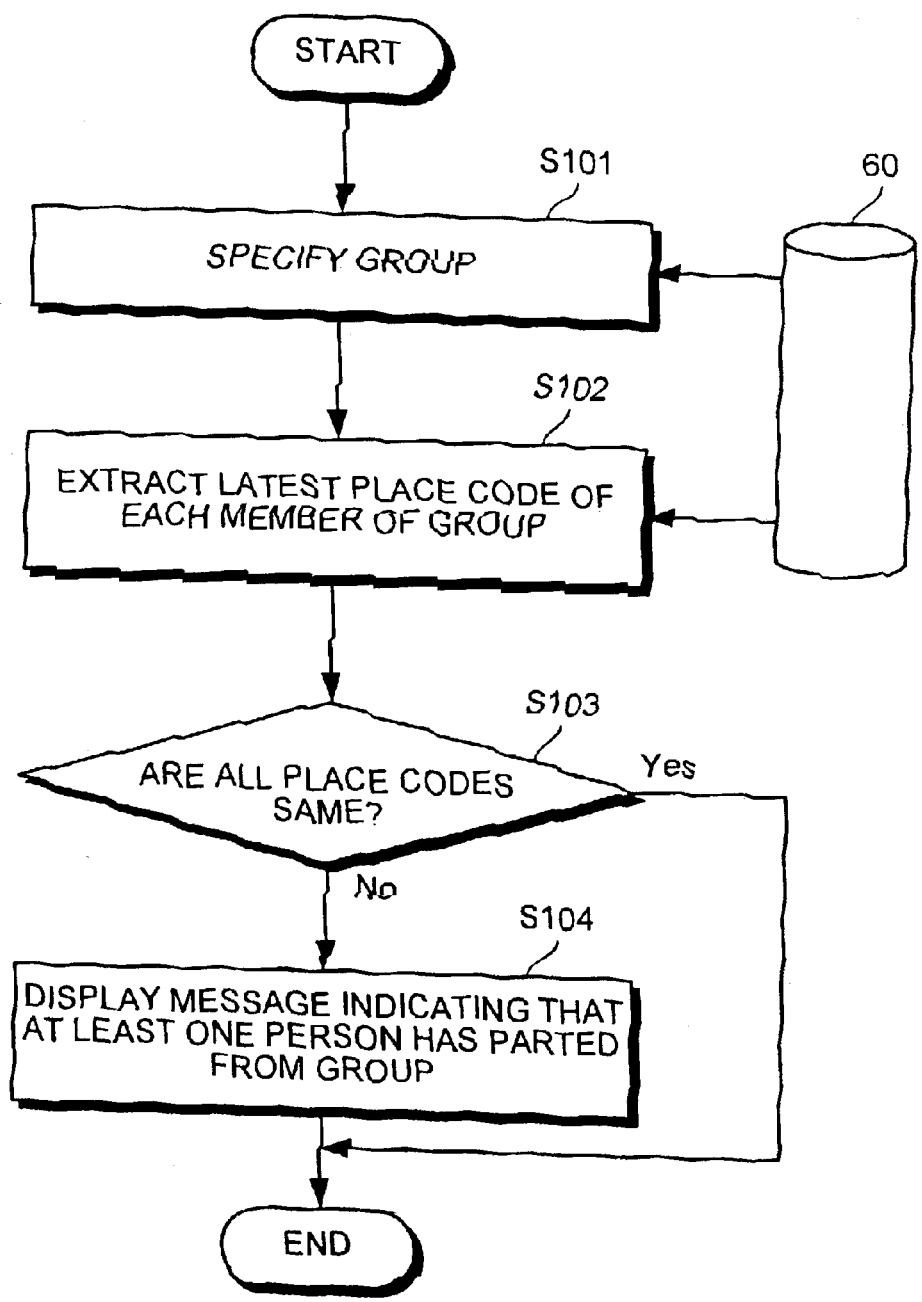
FIG. 15 is a flowchart that explains a parted person monitoring process.

The parted person monitoring process will now be explained in detail below with reference to FIG. 15. In this process, it is assumed here that the tag readers 21 are connected to the relay device 22 through a single common cable.

The monitoring unit 40 executes the parted person monitoring process periodically or when the tag history table is updated. First, the group to be a target (hereinafter, "target group") is specified (step S101). Precisely, the operator specifies the group by using the input device 62. Alternatively, the monitoring unit 40, by referring to the group table, may periodically specify the groups one by one as the target group. Then, the monitoring unit 40, by referring to the group table and the tag-person relation table, extracts the tag identification information corresponding to each member of the group specified, and acquires the place code lately registered, with respect to the tag identification information extracted (step S102). Next, the monitoring unit 40 judges whether all of the place codes acquired are the same (step S103).

If all of the place codes are the same (step S103, Yes), then the monitoring unit 40 either does nothing or causes the display 42 to display a message indicating that all of the members of the group are in one surveillance area. The monitoring unit 40 may notify a similar message to even the guard. Precisely, a signal including the message is transmitted to the monitoring information transceiver 70, and the information terminal 80 receives the signal from the monitoring information transceiver 70 and displays the message. As a result, the operator of the central monitoring device 100 or the guard carrying the information terminal 80 comes to know that the target group is in one surveillance area.

Figure 16:
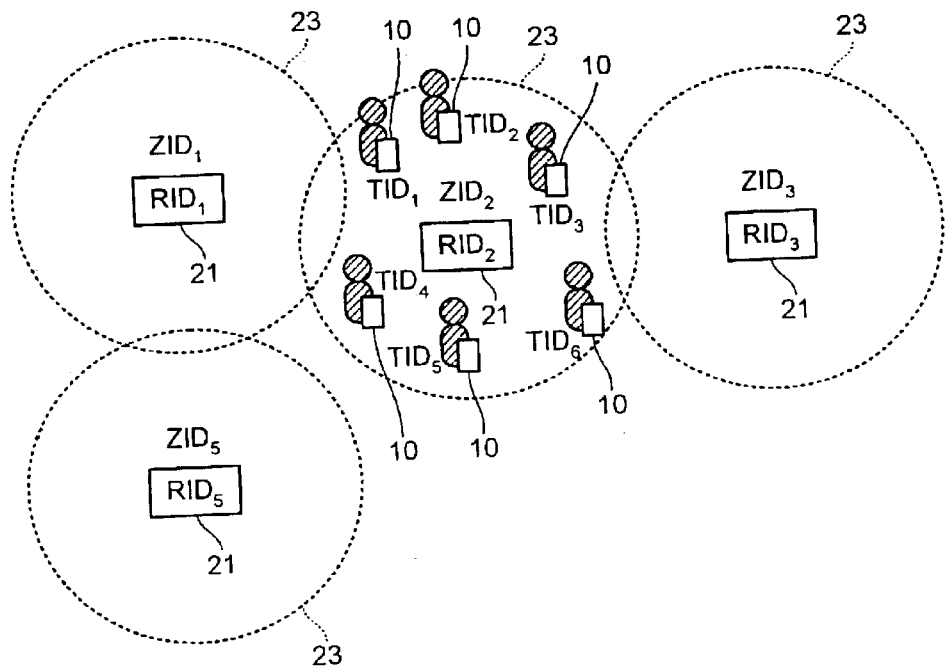
FIG. 16 explains the state that all the persons belonging to one group exist in one surveillance area.

FIG. 16 explains the state that all the persons belonging to one group exist in one surveillance area. As shown in FIG. 16, all of the persons identified by the tag identification information $TID_1$ to $TID_6$ are in the surveillance area specified by the place code $ZID_2$. In this case, the tag reader 21 with the reader identification information $RID_2$ detects all of the RFID tags 10 carried by the persons in the group. Thus, the monitoring unit 40 judges that no person has parted from the group.

On the other hand, if all of the place codes are not the same (step S103, No), that is, if the members of the group exist into a plurality of surveillance areas, then the monitoring unit 40 causes the display 42 to display a message indicating that at least one person has parted from the group (step S104). Even in this case, the monitoring unit 40 may notify a similar message to the guard. As a result, the operator or the guard comes to know that the members of the target group are distributed among a plurality of surveillance areas.

When the persons of one group exist in different surveillance areas, the monitoring unit 40 determines an appropriate place code of the group based on methods explained below:

(i) out of the place codes extracted at the step S102, the monitoring unit 40 determines a place code, of the area in which a majority of the members exist, as the appropriate place code, (ii) based on the action schedule table, the monitoring unit 40 determines a place code, of the area where the group is supposed to stay at the current time, as the appropriate place code, or (iii) the monitoring unit 40 determines a place code, of the area where the supervisor of the group is present, as the appropriate place code.

Figure 17:
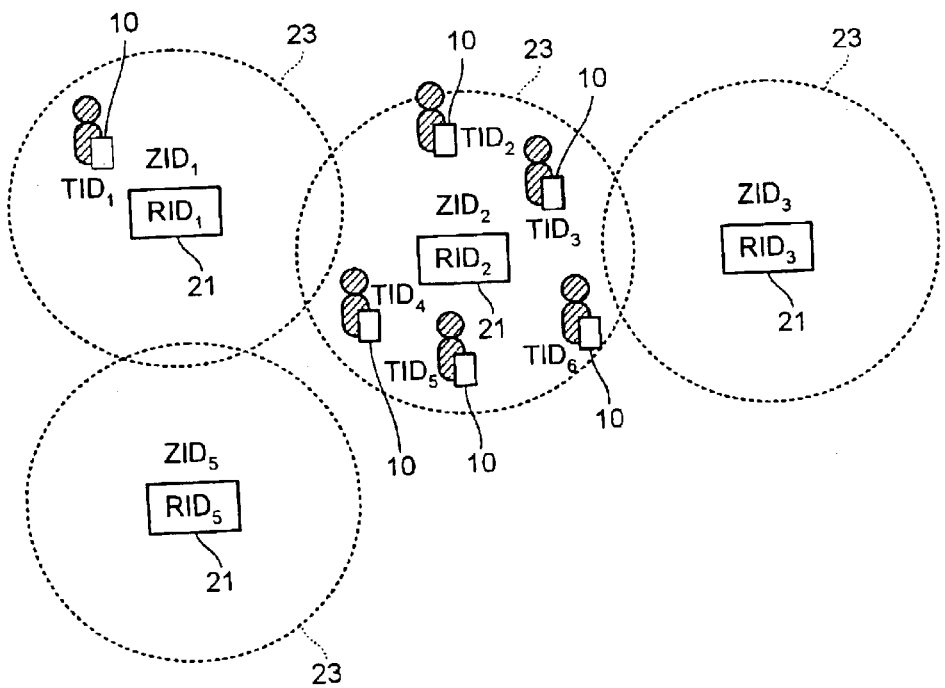
FIG. 17 explains the state that the persons belonging to one group exist in more than one surveillance areas.

FIG. 17 explains the state that the persons belonging to one group exist in more than one surveillance areas. As shown in FIG. 17, the persons identified by the tag identification information $TID_2$ to $TID_6$, are in the surveillance area specified by the place code $ZID_2$. One person, corresponding to the tag identification information $TID_1$, belonging to the same group is in the surveillance area specified by the place code $ZID_1$. In this case, the tag reader 21 corresponding to the reader identification information $RID_2$ and arranged in the area corresponding to the place code $ZID_2$, detects the RFID tags 10 of the tag identification information $TID_2$ to $TID_6$. On the other hand, the other tag reader 21 corresponding to the reader identification information $RID_1$ and arranged in the area corresponding to the place code $ZID_1$ detects the RFID tag 10 of the tag identification information $TID_1$. The monitoring unit 40 judges the place code $RID_2$ as an appropriate place code of the group based on the above method (i), because, five out of six members are detected in the area corresponding to the place code $RID_2$. Moreover, since one person is detected in the area having a place code different from the appropriate place code, the monitoring unit 40 judges that that person has parted from the group. In other words, the monitoring unit 40 judges that the person corresponding to the tag identification information $TID_1$, detected in the area corresponding to the place code $ZID_1$ has parted from the group.

FIG. 18 shows an example of a message output when somebody has parted from the group. It is assumed here that the group denoted by "MMM".(see FIG. 9) is in the place denoted by "E1-A-2" (see FIG. 7), and the persons respectively denoted by "AAA" and "CCC" (see FIG. 8) are in the place denoted by "E1-A-3" and they have parted from the group.

The monitoring unit 40 may judge a position of the target group based on the following method. That is, for example, at the step S103, when there are a plurality of the surveillance areas having the same number of the persons that belong to one group, the monitoring unit 40 may retrieve the tag history table for the past positions of the target group, presume and determine the current position of the target group from the past positions.

The behavior monitoring process will now be explained in detail below. This behavior monitoring process is performed by the monitoring unit 40 by referring to the monitoring information storage 60.

The monitoring unit 40 judges whether the target group acts according to behavior that is recorded in the relation definition table (see FIG. 11). If the target group acts like that, the monitoring unit 40 causes the display 42 to display a message indicating behavior of the target group and/or transmits the message to the information terminal 80 via the monitoring information transceiver 70.

Moreover, the monitoring unit 40 may judge the target group's behavior by the predetermined attribute that is recorded in the relation definition table.

The behavior in the relation definition table may be set, for example, as follows:

(i) persons belonging to predetermined different groups are not allowed to exist in one surveillance area at the same time (e.g., see the record of the relation flag "FXC" in FIG. 11 and FIG. 12), and (ii) the target group or a person(s) of the target group is not allowed to enter into the prohibited area (e.g., see the record of the relation flag "FPA" in FIG. 12).

On the other hand, the attribute in the relation definition table may be set, for example, as follows:

(i) by setting the supervisor of the target group (e.g., see the record of the relation flag "FGL" in FIG. 11 and FIG. 12), (ii) by deciding the observer of the target group, and (iii) by deciding a sub-group of the target group (e.g., see the record of the relation flag "FSG" in FIG. 12).

Returning to FIG. 11 and FIG. 12, one example of the attribute indicates that the person identified by person identification information $PID_1$ is a supervisor of the group identified by group identification information $GID_1$. One example of the behavior indicates that the group identified by group identification information $GID_2$ and the group identified by group identification information $GID_6$ are not allowed to be in the same place at a given time.

One example of the behavior monitoring process will be explained in detail below with reference to FIG. 19 and FIG. 20. It is considered to monitor whether group MMM and group QQQ are in the same surveillance place or they approach. The monitoring unit 40, first, acquires the relation definition table from the monitoring information storage 60 (step S201), and sets, according to the contents of the relation definition table acquired, group MMM and group QQQ as the target groups (step S202). Then, the monitoring unit 40 initializes an approach flag AFLG and an encounter flag CFLG to a value "false" (step S203). Next, the monitoring unit 40 determines a place code of the groups (that is, the appropriate place codes) as described above, and thus acquires the current position (hereinafter, "POS1") of the group MMM and the current position (hereinafter, "POS2") of the group QQQ (step S204).

Figure 21:
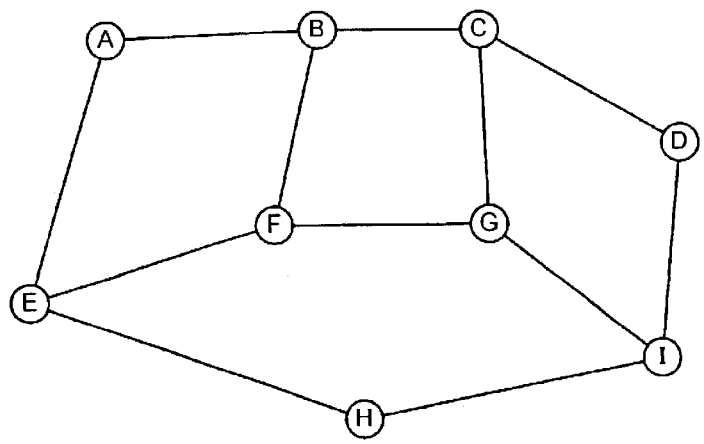
FIG. 21 explains the concept of the logical distance between the surveillance areas.

Next, the monitoring unit 40 judges whether a distance between the positions POS1 and POS2 is shorter than a predetermined distance but not zero (step S205). The distance between POS1 and POS2 may be categorized into a physical distance and a logical distance. The physical distance is a distance between moving objects without considering the path of movements of the objects. On the other hand, the logical distance takes into consideration a minimum number of links between two nodes, in a network which is linked by a plurality of paths. The nodes in the network represent, for example, the surveillance areas in the present invention. As shown in FIG. 21, for example, the logical distance between nodes A and F is as two, and the logical distance between nodes E and D is three.

Returning to FIG. 19, if the distance between the positions POS1 and POS2 is shorter than the predetermined distance but not zero (step S205, Yes), the monitoring unit 40 judges whether the value of the AFLG is "true" (step S206). At this step S206, if it is determined that the value of the AFLG is not "true" (step S206, No), the monitoring unit 40 recognizes that the group MMM and group QQQ have approached each other. In this case, the monitoring unit 40 causes the display 42 to display a message indicating that the group MMM and group QQQ have approached each other, and transmits the message to the information terminal 80 via the monitoring information transceiver 70 (step S207). Furthermore, the monitoring unit 40 changes the value of the AFLG to "true" (step S208).

Then, the monitoring unit 40 judges whether an operator instructs to stop this behavior monitoring process or a predetermined condition for stopping this behavior monitoring process is met (step S209). When the operator instructs to stop or the predetermined condition is met, the monitoring unit 40 ends the behavior monitoring process. When neither the operator instruct to stop nor the predetermined condition is met (step S209, No), the monitoring unit 40 repeats the process starting from the step S204.

On the other hand, if the distance between the positions POS1 and POS2 is longer than the predetermined distance or if it is zero (step S205, No), the monitoring unit 40 judges whether the value of the AFLG is "true" (step S211). At this step S211, if it is determined that the value of the AFLG is "true", the monitoring unit 40 determines that the group MMM and group QQQ are spaced apart. In this case, the monitoring unit 40 causes the display 42 to display a message indicating that the group MMM and group QQQ do not approach each other, and transmits the message to the information terminal 80 via the monitoring information transceiver 70 (step S212). Furthermore, the monitoring unit 40 changes the value of the AFLG to "false" (step S213).

Then, the monitoring unit 40 executes the process of the step S209. Moreover, if it is decided at the step S211 that the value of the AFLG is not "true", the monitoring unit 40 executes the process of the step S209.

Figure 19:
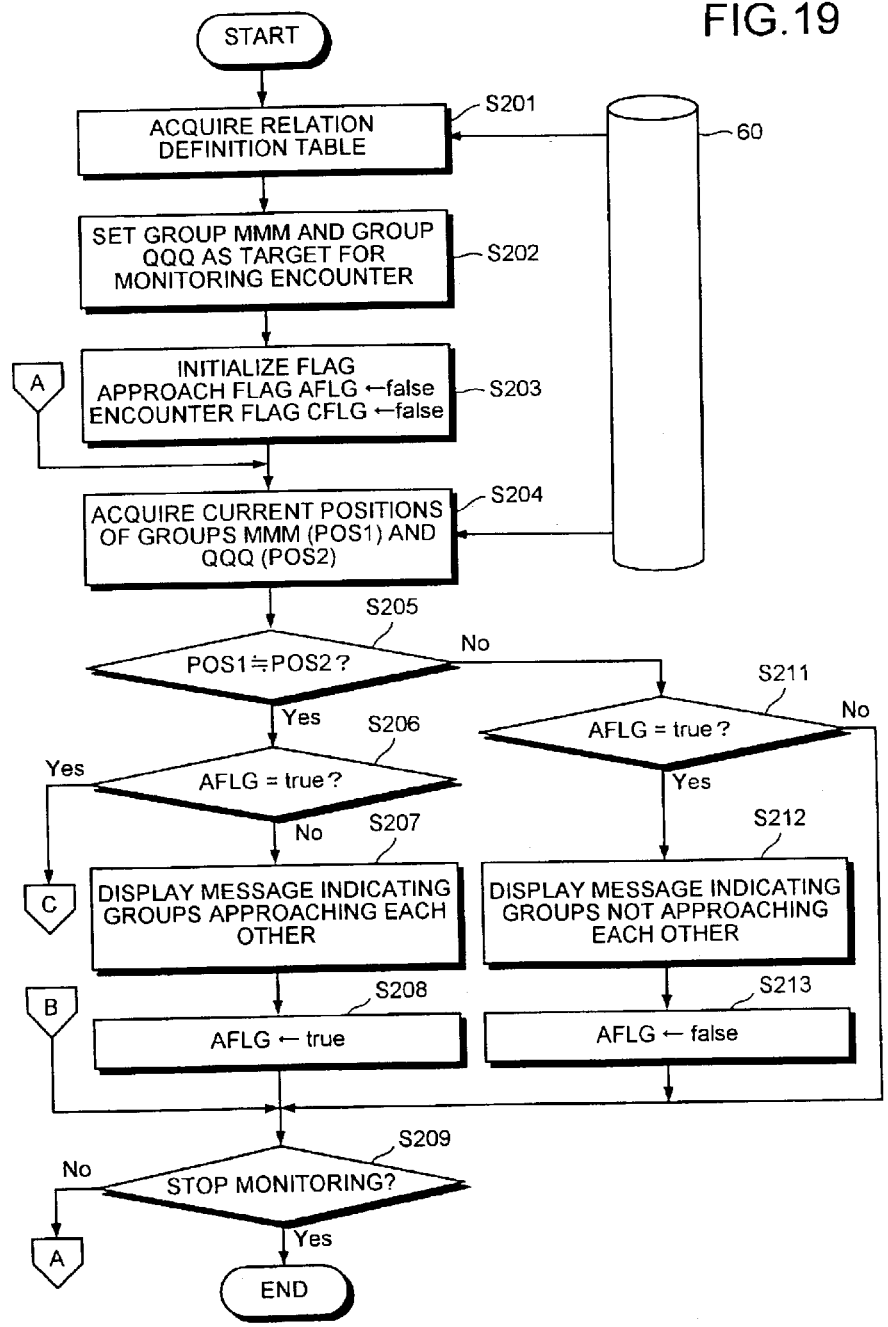
FIG. 19 is a flowchart that explains a behavior monitoring process.
Figure 20:
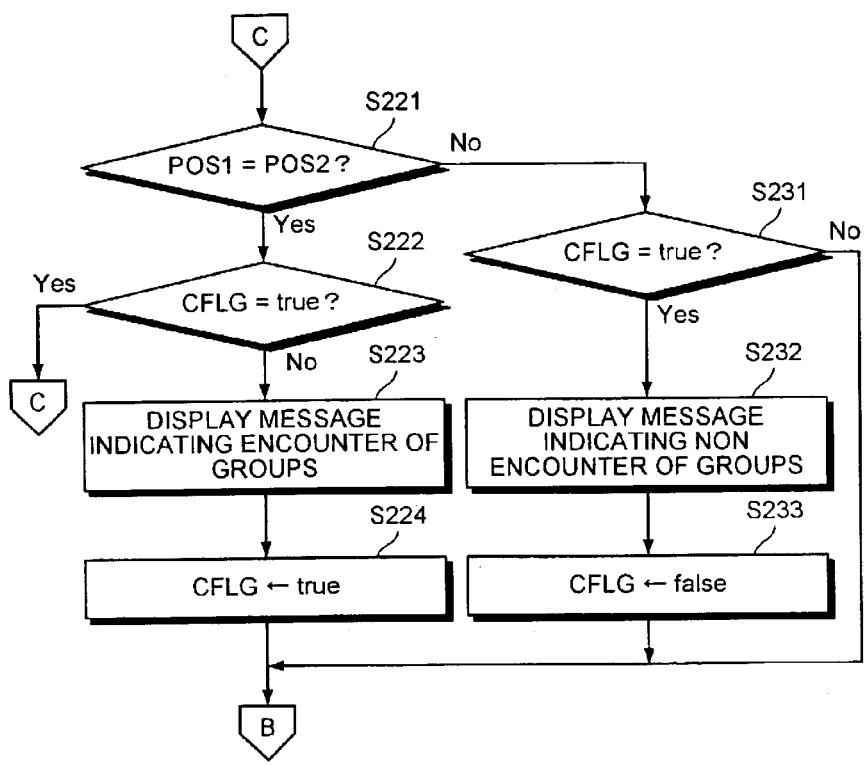
FIG. 20 is a continuation of the flowchart of FIG. 19.

If it is determined at the step S206 that the value of the AFLG is "true" (step S206, Yes), the monitoring unit 40 judges whether the values of POS1 and POS2 are equal (step S221 in FIG. 20). If it is determined that the values of POS1 and POS2 are equal (step S221, Yes), the monitoring unit 40 determines that the group MMM and group QQQ have encountered each other. In this case, the monitoring unit 40 further judges whether the value of the CFLG is "true" (step S222). If it is judged at the step S222 that the value of the CFLG is not "true", the monitoring unit 40 causes the display 42 to display a message indicating that the group MMM and group QQQ have encountered each other, and transmits the message to the information terminal 80 via the monitoring information transceiver 70 (step S223). Furthermore, the monitoring unit 40 changes the value of the CFLG to "true" (step S224). Then, the monitoring unit 40 executes the process of the step S209 (see FIG. 19).

On the other hand, if it is judged at the step S221 that the values of POS1 and POS2 are not equal (step S221, No), the monitoring unit 40 further judges whether the value of the CFLG is "true" (step S231). If it is judged at the step S231 that the value of the CFLG is "true", the monitoring unit 40 determines that the group MMM and group QQQ have not encountered each other and that the group MMM and group QQQ exist in separate surveillance areas. In this case, the monitoring unit 40 causes the display 42 to display a message indicating that the group MMM and group QQQ have not encountered each other, and transmits the message to the information terminal 80 via the monitoring information transceiver 70 (step S232). Furthermore, the monitoring unit 40 changes the value of the CFLG to "false" (step S233).

Then, the monitoring unit 40 executes the process of the step S209 (see FIG. 19). Moreover, if it is judged at the step S231 that value of the CFLG is not "true", the monitoring unit 40 executes the process of the step S209.

As explained above, the monitoring unit 40 can monitor behavior of a group or persons according to the relation definition table, and inform the result of the monitoring to the operator, the observer, or the guard in the form of a message.

Figure 22:
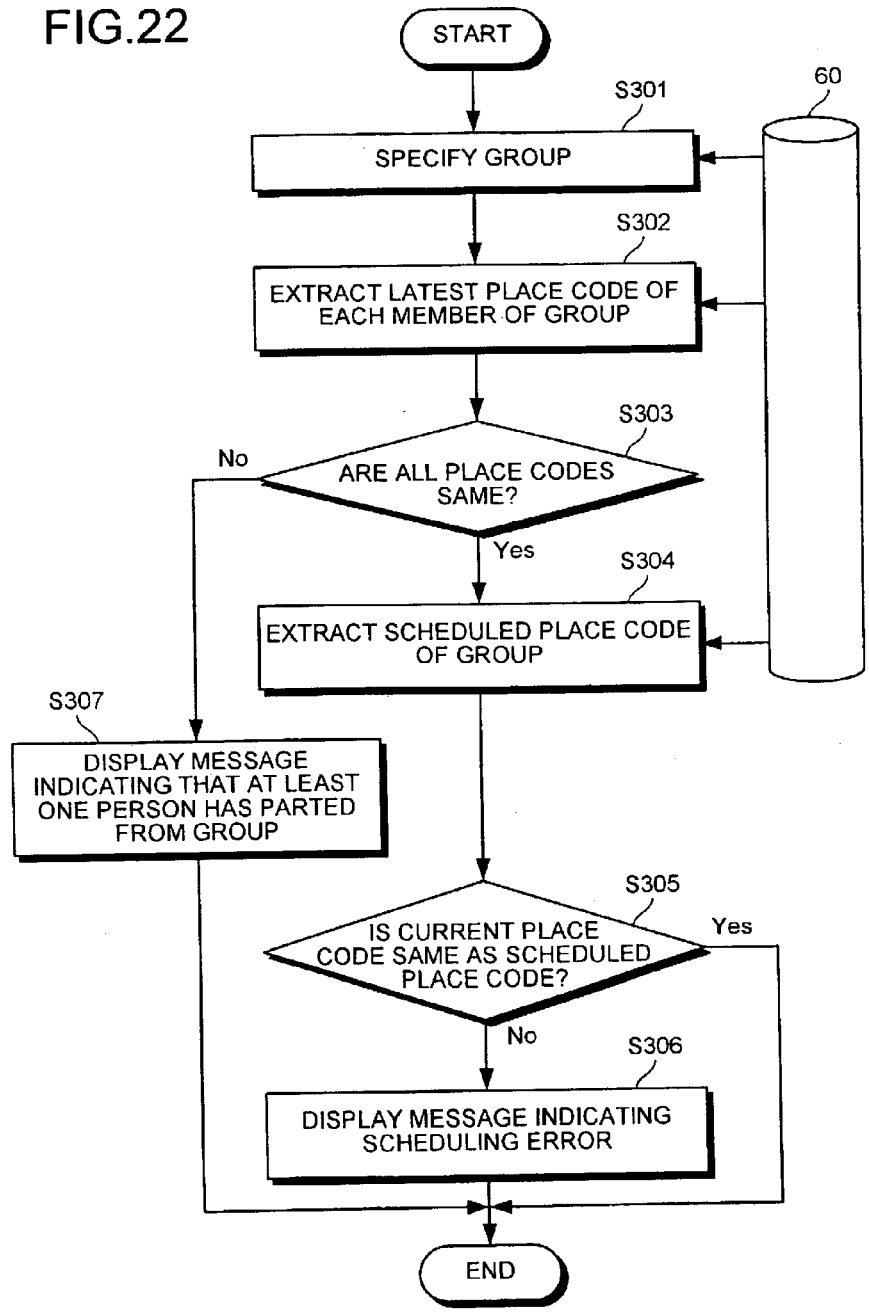
FIG. 22 is a flowchart that explains a schedule monitoring process.

The schedule monitoring process will now be explained in detail below with reference to FIG. 22. This schedule monitoring process is executed by the monitoring unit 40 by referring to the monitoring information storage 60.

The monitoring unit 40 executes the schedule process periodically or when the tag history table is updated by the tag history registration process. First, the target group is specified in the same manner as the one explained with respect to the process of the step S101 shown in FIG. 15 (step S301). Then, the monitoring unit 40 acquires the place code (that is, current place code) lately registered in the same manner as the one explained with respect to the process of the step S102 shown in FIG. 15 (step S302). Next, the monitoring unit 40 judges whether all of the place codes acquired are the same (step S303). If it is determined that all of the place codes are the same, the monitoring unit 40 extracts the place code (hereinafter, "scheduled place code") of the surveillance area where the target group is scheduled to stay at the current time, from the action schedule table (see FIG. 13) (step S304).

Then, the monitoring unit 40 judges whether the current place code identified at the step S303 is the same as the scheduled place code extracted at the step S304 (step S305). If it is determined that the current place code is not the same as the scheduled place code, the monitoring unit 40 causes the display 42 to display a message indicating that the current action of the target group is not the same as the action scheduled in the action schedule table along with an amount of advance or delay in the time (hereinafter, "time error"). As a result, the operator or the guard comes to know that the target group is not moving according to the schedule.

On the other hand, at the step S303, if it is determined that all of the place codes are not the same (that is, the members of the target group are distributed in different surveillance areas), then the monitoring unit 40 causes the display 42 to display a message indicating that at least one person has parted from the group (step S307). The monitoring unit 40 may also send a similar message to the guard.

As explained above, in the monitoring system according to the present invention, the monitoring device 100 receives the tag identification information of the RFID tags 10 from the tag readers 21, and thus identifies the areas where the persons each carrying the RFID tag 10 exist. As a result, the monitoring device 100 can monitor, by referring to the group information which is associated with the tag identification information received, behavior of groups of persons. Concretely, it is possible to detect a person who has parted from his group, a person or a group behaving according to the predetermined action, and whether the group is moving according to the schedule.

The method according to the present invention may be executed as a computer program. Moreover, in the above embodiments, a program that executes the tag history registration process, the parted person monitoring process, the behavior monitoring process, and the schedule monitoring process may be recorded on a computer-readable recording medium. The recording medium may be an optical disk, a flexible disk, or a hard disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of monitoring behavior of a group of a plurality of persons each carrying a radio frequency identification tag, the method comprising:
   acquiring tag identification information that is unique to the radio frequency identification tag from a tag reader configured to detect the radio frequency identification tag in an area where the tag reader is arranged;
   determining a position of each of the persons in the group based on the tag identification information and the area; and
   determining behavior of the group based on the positions of the persons.

2. The method according to claim 1, wherein the determining behavior includes determining whether all the positions of the persons are substantially in the same area where the tag reader is arranged.

3. The method according to claim 2, further comprising determining a position of the group based on the positions of the persons.

4. The method according to claim 3, wherein the determining a position of the group includes identifying a position of a majority of the persons in the group as the position of the group when it is determined that the positions are not substantially in the same area.

5. The method according to claim 3, wherein the position of the group is determined based on a predetermined schedule of the group when it is determined that the positions are not substantially in the same area.

6. The method according to claim 3, wherein the position of the group is determined based on a predetermined position of a person-in-charge of the group when it is determined that the positions are not substantially in the same area.

7. The method according to claim 3, further comprising outputting information indicating that a person whose position is not substantially in the same area parts from the group.

8. The method according to claim 1, further comprising:
   recording positional history that includes the position at a certain time of the radio frequency identification tag and reader identification information that is unique to the tag reader, based on timing at which the tag identification information is acquired from the tag reader; and
   acquiring a set of the tag identification information and the reader identification information at a recorded time from the positional history,
   wherein the determining a position of each of the persons and the determining behavior of the group are executed based on the set of the tag identification information and the reader identification information acquired.

9. The method according to claim 3, further comprising:
   determining whether the determined position of the group is substantially the same as a scheduled position of the group decided based on a predetermined schedule of the group.

10. The method according to claim 9, further comprising:
    determining that the group is not moving according to the predetermined schedule when the position of the group is not substantially the same as the scheduled position of the group.

11. A method of monitoring behavior of a group of a plurality of persons each carrying a radio frequency identification tag, the method comprising:
    acquiring tag identification information that is unique to the radio frequency identification tag from a tag reader configured to detect the radio frequency identification tag in an area where the tag reader is arranged;
    determining the group and a position of the group based on the tag identification information and the area;
    determining person information corresponding to the determined group, based on the tag identification information belonging to the group; and
    determining whether a predetermined relationship is satisfied between at least two selected from the group, the position of the group, and the person information.

12. The method according to claim 11, further comprising sending a notification that indicates the predetermined relationship when it is determined that the predetermined relationship is satisfied.

13. A method of monitoring behavior of a plurality of groups each including a plurality of persons each carrying a radio frequency identification tag, the monitoring method comprising:
    acquiring tag identification information that is unique to the radio frequency identification tag from a tag reader configured to detect the radio frequency identification tag in an area where the tag reader is arranged;
    determining a position of each of the groups based on the tag identification information and the area; and determining any one of whether the determined groups are approaching towards each other and whether the determined groups have encountered with each other based on the position of each of the groups.

14. The method according to claim 13, further comprising:
sending a notification that indicates approach of the groups when it is determined that the groups are approaching towards each other, and
sending a notification that indicates encounter of the groups when it is determined that the groups have encountered with each other.

15. A computer program product including computer executable instructions stored on a computer readable medium, wherein the instructions, when executed by the computer, cause the computer to perform:
acquiring tag identification information of a radio frequency identification tag from a tag reader configured to detect the radio frequency identification tag in an area where the tag reader is arranged;
determining a position of each of a plurality of persons in a group each carrying the radio frequency identification tag based on the tag identification information and the area; and
determining behavior of the group based on the positions of the persons.

16. A computer program product including computer executable instructions stored on a computer readable medium, wherein the instructions, when executed by the computer, cause the computer to perform:
acquiring tag identification information that is unique to a radio frequency identification tag from a tag reader that detects the radio frequency identification tag being in an area where the tag reader is arranged;
determining a group of a plurality of persons each carrying a radio frequency identification tag and a position of the group based on the tag identification information and the area;
determining person information corresponding to the determined group, based on the tag identification information belonging to the group; and
determining whether a predetermined relationship is satisfied between at least two selected from the group, the position of the group, and the person information.

17. A computer program product including computer executable instructions stored on a computer readable medium, wherein the instructions, when executed by the computer, cause the computer to perform:
acquiring tag identification information that is unique to a radio frequency identification tag from a tag reader configured to detect the radio frequency identification tag in an area where the tag reader is arranged;
determining a position of each of a plurality of groups including a plurality of persons each carrying the radio frequency identification tag based on the tag identification information and the area; and
determining any one of whether the determined groups are approaching towards each other and whether the identified groups have encountered with each other based on the position of each of the groups.

18. A monitoring system for monitoring behavior of a group of a plurality of persons, the monitoring system comprising:
a radio frequency identification tag carried by each of the persons, the radio frequency identification tag configured to transmit a wireless tag signal that includes tag identification information unique to the radio frequency identification tag;
a tag reader configured to receive the wireless tag signal and transmit a reader signal that includes the tag identification information included in the wireless tag signal and reader identification information unique to the tag reader; and
a determining unit configured to determine an area where the tag reader is arranged based on the reader identification information included in the reader signal, a position of each of the persons in the group based on the tag identification information and the area, and behavior of the group based on the positions of the persons.

19. A monitoring system for monitoring behavior of a group of a plurality of persons, the monitoring system comprising:
a radio frequency identification tag carried by each of the persons, the radio frequency identification tag configured to transmit a wireless tag signal that includes tag identification information unique to the radio frequency identification tag;
a tag reader configured to receive the wireless tag signal and transmit a reader signal that includes the tag identification information included in the wireless tag signal and reader identification information unique to the tag reader; and
a determining unit configured to determine an area where the tag reader is arranged based on the reader identification information included in the reader signal, the group, a position of the group, and person information that corresponds to the group, based on the tag identification information and the area, and whether a predetermined relationship is satisfied between at least two selected from the group, the position of the group, and the person information.

20. A monitoring system for monitoring behavior of a plurality of groups including a plurality of persons, comprising:
a radio frequency identification tag carried by each of the persons, the radio frequency identification tag configured to transmit a wireless tag signal that includes tag identification information unique to the radio frequency identification tag;
a tag reader configured to receive the wireless tag signal and transmit a reader signal that includes the tag identification information included in the wireless tag signal and reader identification information unique to the tag reader; and
a determining unit configured to determine an area where the tag reader is arranged based on the reader identification information included in the reader signal, a position of each of the groups based on the tag identification information and the area, and any one of whether the determined groups are approaching towards each other and whether the determined groups have encountered with each other based on the position of each of the groups.

* * * * *